United States Patent
Coors et al.

(10) Patent No.: US 9,401,661 B2
(45) Date of Patent: *Jul. 26, 2016

(54) CONNECTING AN INVERTER IN A SOLAR POWER PLANT WITH SHIFTED POTENTIAL CENTER POINT

(71) Applicant: SMA Solar Technology AG, Niestetal (DE)

(72) Inventors: Stephanie Coors, Knuellwald (DE); Tobias Mueller, Escherode (DE); Oliver Prior, Marsberg (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 3 days.

This patent is subject to a terminal disclaimer.

(21) Appl. No.: 14/324,299

(22) Filed: Jul. 7, 2014

(65) Prior Publication Data

US 2014/0321166 A1   Oct. 30, 2014

Related U.S. Application Data

(63) Continuation of application No. 13/671,914, filed on Nov. 8, 2012, now Pat. No. 8,804,390.

(30) Foreign Application Priority Data

Nov. 10, 2011  (DE) .......................... 10 2011 055 220

(51) Int. Cl.
*H02M 7/44*  (2006.01)
*H02M 7/42*  (2006.01)
(Continued)

(52) U.S. Cl.
CPC .. *H02M 7/42* (2013.01); *H02J 3/08* (2013.01); *H02J 3/383* (2013.01); *H02J 3/40* (2013.01); *Y02E 10/563* (2013.01); *Y10T 307/735* (2015.04)

(58) Field of Classification Search
CPC ............... H02J 3/005; H02J 3/08; H02J 3/40; H02J 3/42; H02J 3/44; H02M 7/42; H02M 7/44; H02M 7/48; H02M 7/53; H02M 7/53846; H02M 7/53862; H02M 7/5387
USPC ............... 363/56.01, 56.02, 95, 97, 131, 132; 323/906; 307/85, 86, 87, 125
See application file for complete search history.

(56) References Cited

U.S. PATENT DOCUMENTS 4,922,400 A * 5/1990 Cook ............................... 363/37
5,499,178 A * 3/1996 Mohan ........................... 363/39
(Continued)

FOREIGN PATENT DOCUMENTS

EP    2136449 A1   12/2009
EP    2228893 A2    9/2010
(Continued)

OTHER PUBLICATIONS

Notice of Allowance dated Apr. 11, 2014 for U.S. Appl. No. 13/671,914.

*Primary Examiner* — Gary L Laxton
(74) *Attorney, Agent, or Firm* — Eschweiler & Associates, LLC

(57) ABSTRACT

The invention relates to a process of connecting an AC output of a transformerless inverter of a solar power plant to an internal AC power grid at an input side of a galvanic isolation, while an offset voltage for shifting a potential center point of a photovoltaic generator connected to the inverter is applied. The process includes: (i) synchronizing the inverter with the power grid; (ii) essentially matching a potential center point of the current-carrying lines of the AC output and a potential center point of the power grid, while only one of the potential center points of the current-carrying lines and the power grid is yet shifted by the offset voltage; and (iii) galvanically connecting all current-carrying lines of the AC output with the power grid only after the steps of synchronizing and essentially matching.

13 Claims, 2 Drawing Sheets

(51) Int. Cl.
*H02J 3/08* (2006.01)
*H02J 3/38* (2006.01)
*H02J 3/40* (2006.01)
*H02M 7/5387* (2007.01)

(56) References Cited

U.S. PATENT DOCUMENTS

| | | | | |
|---|---|---|---|---|
| 6,137,704 | A * | 10/2000 | Ito et al. | 363/132 |
| 6,239,997 | B1 | 5/2001 | Deng | |
| 6,339,538 | B1 | 1/2002 | Handlemann | |
| 6,611,441 | B2 | 8/2003 | Kurokami et al. | |
| 7,466,571 | B2 | 12/2008 | Deng et al. | |
| 7,576,547 | B2 | 8/2009 | Mueller et al. | |
| 8,053,930 | B2 | 11/2011 | Cramer et al. | |
| 8,310,214 | B2 * | 11/2012 | Garces Rivera et al. | 323/207 |
| 8,804,390 | B2 * | 8/2014 | Coors et al. | 363/132 |
| 2007/0285102 | A1 | 12/2007 | Muller | |
| 2009/0315404 | A1 | 12/2009 | Cramer et al. | |
| 2011/0273017 | A1 | 11/2011 | Borup et al. | |
| 2012/0001491 | A1 | 1/2012 | Cramer et al. | |
| 2012/0039101 | A1 | 2/2012 | Falk et al. | |
| 2012/0063179 | A1 * | 3/2012 | Gong et al. | 363/40 |

FOREIGN PATENT DOCUMENTS

EP 2242160 A1 10/2010
WO 2010051812 A1 5/2010

* cited by examiner

CONNECTING AN INVERTER IN A SOLAR POWER PLANT WITH SHIFTED POTENTIAL CENTER POINT

REFERENCE TO RELATED APPLICATIONS

This application is a continuation of U.S. application Ser. No. 13/671,914 filed on Nov. 8, 2012, which claims priority to German application number 10 2011 055 220.0 filed on Nov. 10, 2011.

FIELD

The present invention relates to a method of connecting a transformerless inverter in a solar power plant with a shifted potential center point.

BACKGROUND

It is a known phenomenon that the modules of certain photovoltaic generators, particularly so-called thin film modules, only achieve their maximum lifetime if they are completely kept on negative or positive electric potential with regard to earth potential, particularly during their operation.

For the purpose of ensuring such an electric potential of the modules of all photovoltaic generators connected to an inverter, an offset voltage may be applied in a solar power plant to shift the potential center point of the photovoltaic generators with regard to a reference potential, particularly directly with regard to earth potential.

The offset voltage may be applied to a current carrying line via which all photovoltaic generators are connected to a DC input of the inverter. In a transformerless inverter, this shift of the potential center point of its DC input also has an effect on its AC output, and it will spread from there up to the DC input of further transformerless inverters connected in parallel. Correspondingly, with a transformerless inverter, the offset voltage may also be applied to a current carrying line which is connected to the AC output of the inverter.

European patent EP 2 136 449 B1 discloses a solar power plant including a DC voltage source in an offset path for shifting the potential center point of all photovoltaic generators connected. The offset path leads from one current carrying line at the primary side of a transformer to earth potential. The transformer provides a galvanic separation or isolation between several transformerless inverters connected in parallel and a grid terminal for an external AC power grid. When the transformer comprises a center point at its primary side, the offset path is connected to this center point. If the transformer comprises a delta configuration at its primary side, the offset path extends between one of the phase lines and earth potential.

The inverters are connected in parallel, and each inverter feeds electric power from one photovoltaic generator into one of three phase lines to the transformer. The offset voltage of the DC voltage source has the effect that the photovoltaic generators connected to the inverters are completely on positive electric potential. Further, a current surveying device of the DC voltage source can be used for detecting earth faults. In case of an isolation or earth fault, an increased current via earth potential flows through the offset path. In response to this increased current, a contactor is triggered which disconnects the inverter or the grid terminal from the transformer. A center point line extending between the offset path and the inverters is not disconnected here.

European patent EP 2 136 449 B1 does not refer to connecting the individual inverters to an internal AC power grid at the primary side of the transformer and having a shifted potential center point. The contactor which separates the current connection between the inverters and the transformer or between the grid terminal and the transformer is not suited for this purpose. Thus, it is assumed that the inverter in the solar power plant known from European patent EP 2 136 449 B1 is connected in the usual way, i.e. that the inverter is first synchronized with the internal AC power grid and that then all current carrying lines of the AC output of the synchronized inverter are galvanically connected to the internal AC power grid. Such a procedure is indicated as usual in European patent application publication EP 2 242 160 A1, for example.

A further power plant including a DC voltage source in an offset path for shifting the potential center point of connected photovoltaic generators is known from WO 2010/051812 A1. Here, one or more transformerless three-phase inverters are connected in parallel and each feed electric power from a photovoltaic generator into an external AC power grid via a common transformer providing a galvanic separation or isolation. The offset path is connected to the center point of the primary side of the transformer, independently of whether the center point is connected to the individual inverters or not. In this known circuitry arrangement, the height of the offset voltage which is provided by the DC voltage source is adjusted to the present output voltage of the photovoltaic generators. This output voltage is typically some hundred volts. To bring the photovoltaic generators completely on a positive or negative voltage with regard to earth potential, the offset voltage has to amount to half the output voltage of the photovoltaic generators. For this purpose, the offset voltage is variable in a range from 400 V to 500 V. WO 2010/051812 A1 does not refer to connecting the individual inverters to the internal AC power grid at the primary side of the transformer and having a shifted potential center point.

A measurement arrangement for measuring the isolation resistance of a living electrical device, like for example a photovoltaic generator, is known from DE 10 2006 022 686 A1. Here, two switches or a corresponding changeover switch are provided which each provide a current path between one of the two electric poles of the electrical device and earth potential. The current flowing through a shunt resistor in this earth connection path from one of the electric poles depends on a voltage between the two electric poles and is a measure of the isolation resistance of the respective other pole.

A method of connecting a photovoltaic generator to an input side DC voltage link of an inverter of a solar power plant is known from European patent application publication EP 2 228 893 A2. Here, the DC voltage link is preloaded prior to actually connecting it to the output voltage of the photovoltaic generator to avoid current peaks due to reloading or short-circuit currents.

There is still a need for a method of connecting a transformerless inverter in a solar power plant with a shifted center point which ensures a long lifetime of a controllable switch used for galvanically connecting the current-carrying lines of the output of the inverter to an internal AC power grid at an input side of a galvanic isolation.

SUMMARY

The present invention relates to a method of connecting an AC output of a transformerless inverter of a solar power plant to an internal AC power grid at an input side of a galvanic isolation. The method is applied while at least one photovoltaic generator is connected to a DC input of the inverter, while an external AC power grid is present at an output side of the galvanic isolation, and while an offset voltage for shifting a potential center point of the at least one photovoltaic generator with regard to earth potential is applied. The method comprises synchronizing the inverter with the internal AC power grid, while all current-carrying lines of the AC output of the inverter are still galvanically separated from the internal AC power grid; moving a potential center point of the AC output of the inverter, which is not yet shifted by the offset voltage, in the same direction as the offset voltage by connecting a current-carrying line of the DC input of the inverter to earth potential, while all current-carrying lines of the AC output of the inverter are still galvanically separated from the internal AC power grid and while a potential center point of the internal AC power grid is shifted by the offset voltage. The method then comprises galvanically connecting the current-carrying lines of the AC output of the synchronized inverter to the internal AC power grid after the acts of synchronizing and moving.

Further, the present invention relates to a process of connecting an AC output of a transformerless inverter of a solar power plant to an internal AC power grid at an input side of a galvanic isolation. This process is carried out while at least one photovoltaic generator is connected to a DC input of the inverter, while an external AC power grid is present at an output side of the galvanic isolation, and while an offset voltage for shifting a potential center point of the at least one photovoltaic generator with regard to earth potential is applied. The process comprises synchronizing the inverter with the internal AC power grid, while all current-carrying lines of the AC output of the inverter are still galvanically separated from the internal AC power grid, and essentially matching a potential center point of the current-carrying lines of the AC output of the inverter and a potential center point of the internal AC power grid, while all current-carrying lines of the AC output of the inverter are still galvanically separated from the internal AC power grid and while only one of the potential center points of the current-carrying lines and of the internal AC power grid is shifted by the offset voltage yet. The method further comprises galvanically connecting the current-carrying lines of the AC output of the synchronized inverter to the internal AC power grid after the acts of synchronizing and essentially matching.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
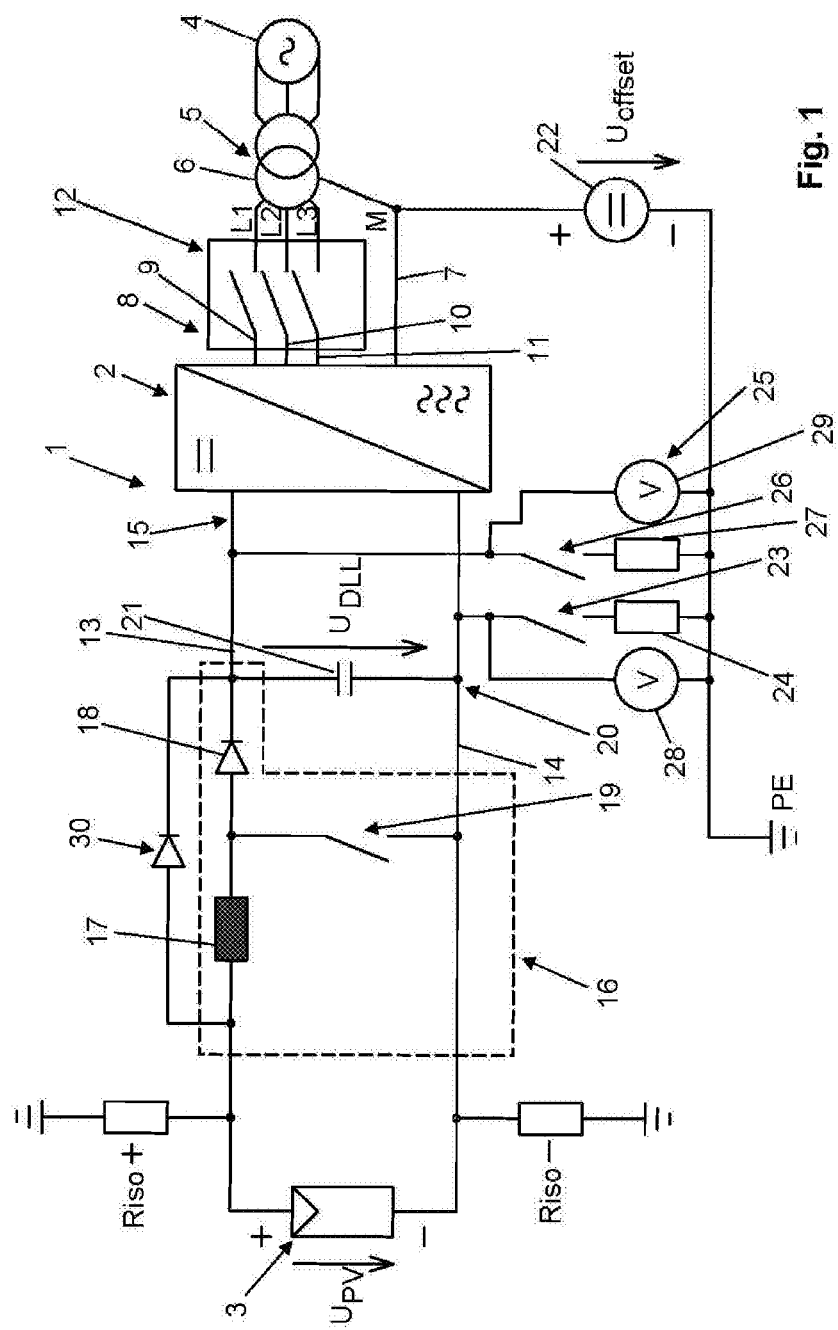
FIG. 1 is a schematic circuit diagram of a solar power plant for illustrating a first embodiment of the method of the present invention.

The present invention relates to a method of connecting an AC output of a transformerless inverter of a solar power plant to an internal AC power grid at an input side of a galvanic isolation, while at least one photovoltaic generator is connected to a DC input of the inverter, while an external AC power grid is present at an output side of the galvanic isolation, and while an offset voltage is applied for shifting a potential center point of the photovoltaic generator with regard to earth potential. In addition to (i) synchronizing the inverter with the internal AC power grid, a further act of (ii) essentially matching a potential center point of the current-carrying lines of the AC output of the inverter and a potential center point of the internal AC power grid is executed prior to (iii) galvanically connecting all current-carrying lines of the AC output of the synchronized inverter to the internal AC power grid.

Without the further act (ii), even with an optimum synchronization of the inverter with the internal AC power grid, voltages are dropping over the switching contacts of a controllable switch used for galvanically connecting in act (iii), which are due to the applied offset voltage and have its magnitude. The reason is that the applied offset voltage, prior to galvanically connecting all current-carrying lines of the AC output of the synchronized inverter to the internal AC power grid, only shifts one of the potential center points of the current-carrying lines of the AC output of the inverter and of the internal AC power grid. These high voltages may cause switching arcs between the switching contacts of the controllable switch which result in an increase in the contact resistance of the closed controllable switch, and in a worst case may even weld the switching contacts together and thus destroy the controllable switch. In any case, switching arcs stress the relay and reduce its lifetime.

The invention thus starts from the finding that the offset voltage which is needed in a solar power plant to shift the potential center point of its photovoltaic generators to such an extent that its modules are completely on positive or negative potential with regard to earth potential is so high that it massively affects the lifetime of the controllable switch used for connecting the transformerless inverter of the solar power plant. Particularly, this offset voltage with regard to earth potential is, in one embodiment, half as high as a present output voltage of the photovoltaic generators. Thus the offset voltage easily amounts to several hundred volts, which is present over the switching contacts of the controllable switch directly when connecting the inverter, if no countermeasure is taken. According to the present invention, this countermeasure includes essentially matching the potential center point of the current-carrying lines of the AC output of the inverter and the potential center point of the internal AC power grid prior to galvanically connecting the current-carrying lines to the internal AC power grid. The countermeasure of essentially matching the potential center points according to the present invention is independent of where the offset voltage is applied.

The measure according to the present invention may be realized by at least one of the following two techniques.

According to the first technique, the offset voltage is adjusted to a reduced value prior to galvanically connecting the current-carrying lines to the internal AC power grid. The reduction has to be compared to an intermediate link voltage of an input side DC voltage link of the inverter. This intermediate link voltage which may be increased by a boost converter or reduced by a buck converter relative to the output voltage of the at least one photovoltaic generator determines the voltage dropping over the switching contacts of the controllable switch due to the offset voltage in galvanically connecting. Particularly, the voltage dropping over the switching contacts will be determined by the potential center point of the intermediate voltage link which will be at about half of the intermediate link voltage with regard to earth potential. The reduction of the offset voltage should be at least 50% of half of this intermediate link voltage. It may be at least 75% or even at least 90% of half of the intermediate link voltage. Correspondingly, the offset voltage, at the point in time of galvanically connecting the current-carrying lines, should be not more the 50% and may be not more than 25% or even 10% of half of the intermediate link voltage of the input side DC voltage link of the inverter, which may still be some ten volts. Hence, it should be noted that essentially matching the potential center points does not require to annihilate any difference in potential between the potential center points. Instead, any essential reduction of this high difference in potential and of the resulting voltages dropping over the switching contacts of the controllable switch in galvanically connecting is helpful.

It belongs to the first technique of essentially matching the two potential center points according to the present invention to raise the offset voltage up to its target value in the range of half the output voltage of the photovoltaic generator only after galvanically connecting the current-carrying lines to the internal AC power grid.

According to the second technique of essentially matching the potential center points, the potential center point that, prior to the step of galvanically connecting, is not yet shifted by the offset voltage applied is shifted in the same direction as the offset voltage.

If the offset voltage is applied in such a way that it, prior to the step of galvanically connecting, only shifts the potential center point of the internal AC power grid, the potential center point of the AC output of the inverter may, for example, be shifted in the same direction as the offset voltage in that a current-carrying line of the DC input of the inverter is either directly earthed or connected to earth potential via a pre-defined resistance. In one embodiment, the value of the pre-defined resistance is small as compared to the usual isolation resistances between the photovoltaic generator and earth potential so that a shift of the potential center point by nearly half of the generator voltage is achieved.

This embodiment of the second technique does not require additional equipment in the solar power plant if it already includes a known device for measuring the isolation resistance of the current-carrying lines of the DC input of the inverter which allows for a voluntary connection of these lines to earth potential via a shunt resistor. According to the present invention, this connection to earth potential, besides measuring the isolation resistance of the respective other line, is also used in connecting the inverter to the power grid.

In one embodiment, the inverter is directly connected to the power grid after disconnecting the previously closed earth contact of the current-carrying line of the DC input of the inverter. Here, use is made of the effect that reloading processes, due to the normally high isolation resistances between photovoltaic generator and earth potential, only proceed slowly and may take some minutes, for example. In case of connecting the inverter directly after disconnecting the current-carrying line from earth potential, the shift of the potential center point of the AC output resulting from the earth contact is thus essentially still present.

Further, also the first technique of essentially matching the potential center points does not require additional equipment in the solar power plant if the offset voltage is variable anyway, which is already suitable to adjust it to half of the present output voltage of the photovoltaic generator.

Referring now in greater detail to the drawings, the solar power plant 1 depicted in FIG. 1 comprises at least one inverter 2 via which electric energy from at least one photovoltaic generator 3 is fed into an AC power grid 4. The inverter 2 is connected to the AC power grid 4 via a transformer 5 providing a galvanic isolation and transforming the output AC voltage of the inverter 2. The inverter 2 as such is a transformerless inverter, i.e. it does not provide a galvanic isolation or separation itself. In parallel with the inverter 2, one or more further inverters 2 with one or more further photovoltaic generators 3 may be connected to the primary winding 6 of the transformer 5.

In the embodiment depicted here, the inverter 2 is a three-phase inverter, and, besides the three phases L1, L2 and L3, it is also connected to a center point M of the primary winding 6 of the transformer 5. However, the line 7 of the output 8 of the inverter 2—in contrast to the lines 9 to 11 of the output 8 connected to the phases L1, L2 and L3—is not carrying a current due to the special switching topology of the inverter 2, for example. A relay 12 is provided between the current-carrying lines 9 to 11 and the phases L1, L2 and L3 of the internal AC power grid. The relay 12 is a controllable switch, and it is controlled to connect the inverter 2, after it has been synchronized with the internal AC power grid, to the primary winding 6 of the transformer 5. Synchronizing the inverter 2 with the internal AC power grid means matching frequency and phase of all alternating voltages output by the inverter to frequency and phase of those voltages alternating in the internal AC power grid. Further and optionally, the amplitudes of all alternating voltages output by the inverter are suitably adjusted to those voltages alternating in the internal AC power grid. Typically, the amplitudes of the voltages output by the inverter are adjusted to be slightly higher than the voltages alternating in the internal AC power grid to ensure a power flow from the inverter into the AC power grid upon closure of the relay 12.

As an alternative to the depicted embodiment, the inverter 2 may be three-phase inverter whose line 7 between the output 8 of the inverters and the center point M of the primary winding 6 of the transformer 5 is also carrying a current due to another switching topology of the inverter 2, for example. In this case, the relay 12 is suitably provided with four switches, three switches for separating or connecting the output 8 of the inverter 2 to the phase lines L1, L2, L3 of the primary winding 6 of the transformer, and one switch for separating or connecting the output 8 of the inverter 2 to and from the center point M of the primary winding 6 of the transformer 5.

In another embodiment (not depicted), the solar power plant comprises a plurality of single-phase inverters 2. These single-phase inverters 2 are each only connected to one phase L1, L2 or L3 and to the center point M of the primary winding 6 of the transformer 5. The inverters 2 are associated with the individual phases in such a way that the entire electric power is distributed over the phases L1, L2, L3 as uniformly as possible. In contrast to the embodiment depicted in FIG. 1, the line 7 from the output 8 of the inverter 2 to the primary side center point M of the transformer 5 will also carry a current in the embodiment described in this paragraph. The relay 12 thus suitably includes two switches for each single-phase inverter 2, one for separating or connecting the phase line L1, L2 or L3 of the primary winding 6 of the transformer 5 from or to the output of the inverter 2 and one for separating or connecting the primary side center point M of the transformer 5 from or to the output 8 of the inverter 2.

The photovoltaic generator 3 is connected to current-carrying lines 13 and 14 of a DC input 15 of the inverter 2. In FIG. 1, a boost converter 16 is provided between the photovoltaic generator 3 and the input 15. The boost converter 16 comprises a storage inductor 17, a rectifier diode 18 and a switch 19 in a usual arrangement and serves for adjusting an output voltage $U_{PV}$ of the photovoltaic generator 3 to a desired intermediate link voltage $U_{DCL}$ of an input side DC voltage link 20 of the inverter 2 which includes a buffer capacitor 21. A bypass diode 30 is connected in parallel to the boost converter 16 and allows passage of electric energy from the photovoltaic generator 3 into the DC voltage link 20 when the output voltage $U_{PV}$ of the photovoltaic generator 3 even without boosting reaches the desired intermediate link voltage $U_{DCL}$. Alternatively, a semiconductor switch or an electromechanical switch may be provided to selectively bypass the boost converter 16. In contrast to the bypass diode 30, a switch requires a controller but the energy loss with a closed switch is smaller than with the conducting bypass diode 30.

During operation, the photovoltaic generator 3 is not connected to earth. However, it has a natural potential center point of earth potential PE. In contrast to this natural potential center point, it is desired that all of the modules of the photovoltaic generator 3, which are not depicted here separately, are at a positive electric potential with regard to earth potential PE, to maximize the lifetime of the photovoltaic generator 3. This particularly applies when these modules are special thin film modules. In order to keep all modules of the photovoltaic generator 3 at a positive potential with regard to earth potential PE, a DC voltage source 22 is provided which applies an offset voltage $U_{offset}$ between earth potential PE and the center point M of the primary winding 6 of the transformer 5. With the relay 12 being closed this offset voltage has an effect via the AC output 8 and the transformerless inverter 2 to its DC input 15 and from there up to the photovoltaic generator 3.

Prior to connecting the inverter 2 to the internal AC power grid at the primary side of the transformer 5, the offset voltage $U_{offset}$, however, only shifts the potential center point of the internal AC power grid at the primary side of the transformer 5 as the line 7—either due to a special switching topology of the inverter 2 or due to a galvanic separation of the line 7 by means of a separate switch of the relay 12—is not carrying a current. A compensation current from the DC voltage source 22 to the inverter 2 which is necessary for shifting the potential center point of the photovoltaic generator 3 may thus not flow. Correspondingly, the offset voltage $U_{offset}$ drops over all switching contacts of the relay 12, even if the inverter 2 is optimally synchronized with the internal AC power grid.

In this context it has to be considered that the offset voltage $U_{offset}$ is, in one embodiment, half the intermediate link voltage $U_{DCL}$ of the input side DC voltage link 20 of the inverter 2 to raise all modules of the photovoltaic generator 3 to a positive electric potential with regards to earth potential PE. Correspondingly, $U_{offset}$ is of a typical order of several hundred volts. Such a high voltage between the switching contacts of the relay 12 can easily result in switching arcs and other effects strongly affecting the lifetime of the relay 12.

To avoid such a high voltage over the relay 12 when connecting the inverter 2, a relay 23 is closed prior to closing the relay 12. This relay 23 connects the line 14 of the DC input 15 via a resistor 24 to earth potential PE. The relay 23 and the resistor 24 are parts of a device 25 for measuring the isolation resistances Riso+ and Riso− of the current-carrying lines 13 and 14 of the DC input 15 and of the corresponding poles of the photovoltaic generator 3. In its normal operation, the device 25 selectively closes either the relay 23 or a relay 26 which connects the other line 13 via a resistor 27 to earth potential PE, prior to activating the inverter 2, and measures the voltages between the lines 13 and 14 and earth potential PE with voltmeters 28 and 29. The difference between these voltages is the output voltage $U_{PV}$ of the photovoltaic generator 3. The voltmeters 28 and 29 directly measure the voltage drops over the parallel connection of the isolation resistance Riso+ and − so far as connected via the relay 26—the resistor 27, and of the isolation resistance Riso− and − so far as connected via the relay 23—the resistor 24. If the resistances of the resistors 24 and 27 are small as compared to the isolation resistances, the voltage drop over the isolation resistance and the connected resistor corresponds to the current through the connected resistor 24 or 27, respectively, from which the isolation resistance Riso+ or Rios− of the respective other line 13 or 14 may be calculated.

In connecting the inverter 2 according to the present invention, however, the relay 23 is closed to connect the line 14 via the resistor 24 to earth and thus to bring the line 24 to an electric potential close to earth potential PE. Actually, due to the voltage drop over the resistor 24, the potential center points of the DC input 15 and of the AC output 8 of the inverter 2 are shifted with regard to earth potential by slightly less than half of the intermediate link voltage $U_{DCL}$. Thus, this shift gets very close to the offset voltage $U_{offset}$ adjusted to half of the output voltage $U_{PV}$ of the photovoltaic generator 3. When the relay 12 is now closed for connecting the synchronized inverter 2 to the transformer 5, there are no high voltages over the switching contacts of the relay 12, and all resulting effects which reduce the lifetime of the relay 12 are avoided.

In one embodiment of the method of the present invention, connecting of the inverter 2 to the internal AC power grid at the primary side of the transformer 5 only takes place directly after reopening the relay 23 and thus directly after disconnecting the connection between the line 14 and earth potential PE. Here, the effect is used that a change of the shift of the potential center point after reopening the relay 23 will only take place comparatively slowly due to the high isolation resistances Riso+ and Riso− and the resulting small reloading currents. If the inverter 2 is connected to the internal AC power grid by closing the relay 12 shortly, particularly directly after reopening the relay 23, the originally generated shift of the potential center point is still present to a sufficient extent at the connecting time.

By keeping the relay 23 closed, the line 14 and thus the negative pole of the photovoltaic generator may also be generally connected to earth potential PE prior to starting the operation of the inverter 2 and/or prior to connecting the inverter 2 to the AC power grid 4 by closing the relay 12, to raise all modules of the photovoltaic generator 3 so far as possible to a positive potential with regard to earth potential PE even in no-load operation in which the offset voltage $U_{offset}$ is not yet provided.

Usually, the boost converter 16, the intermediate voltage link 20, the inverter 2, the device 25 and the relay 12 of the solar power plant 1 according to FIG. 1 are arranged in an inverter housing. The DC voltage source 22 and the transformer 5 may be arranged in a transformer housing to which several inverter housings may be connected.

Figure 2:
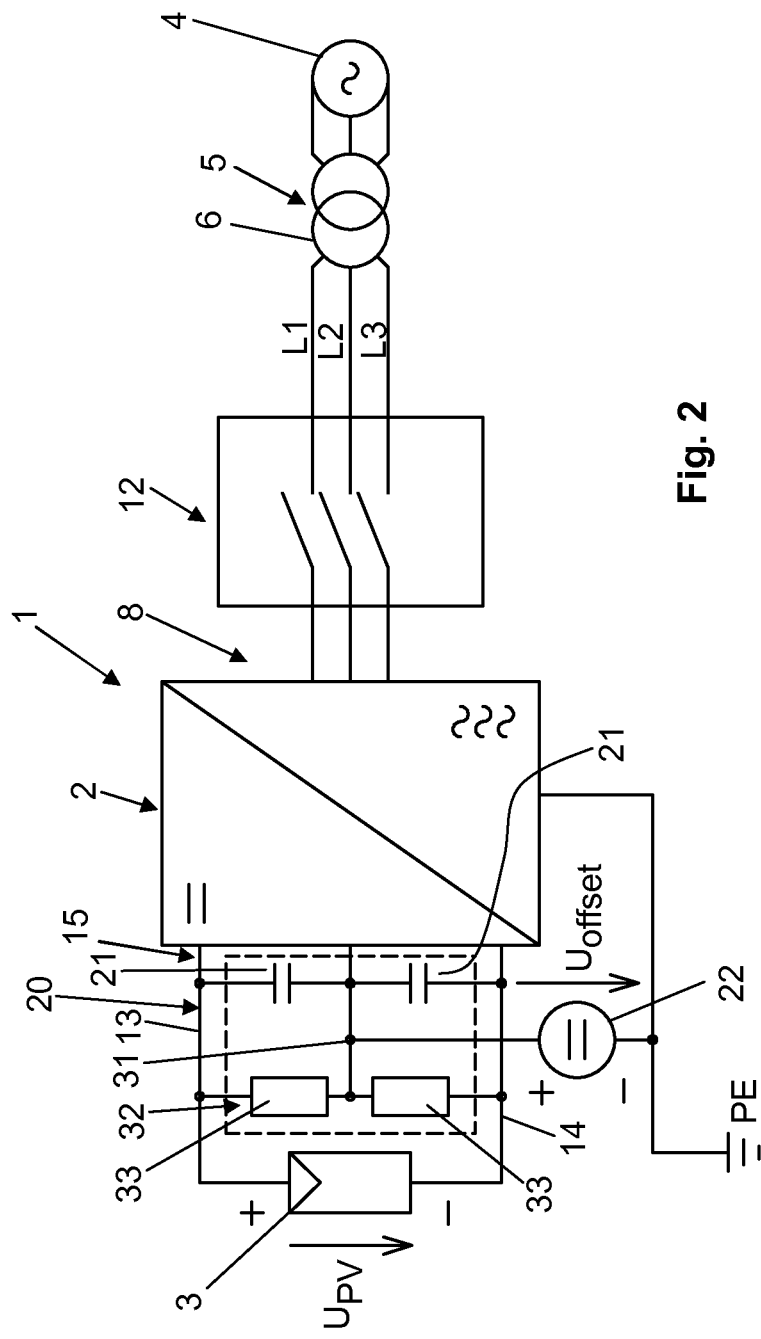
FIG. 2 is a schematic circuit diagram of another solar power plant for illustrating a second embodiment of the method of the present invention.

FIG. 2 depicts a solar power plant 1 in less detail than in FIG. 1; in the following only the relevant differences with regard to the construction according to FIG. 1 are explained. The primary winding 6 of the transformer 5, via which the inverter 2 is connected to the external AC power grid 4, is provided in a delta configuration without a center point. The offset voltage $U_{offset}$ is applied to a center point 31 of a voltage divider 32 in the DC input 15 of the inverter 2, here. The voltage divider 32 is made of two buffer capacitors 21 of a same size connected in series. It is known that such buffer capacitors 21, although manufactured equally, may nevertheless comprise varying leakage currents. This particularly applies to electrolytic capacitors. Differently high leakage currents will result in an undesired deformation of the voltage divider. Thus, it is recommended to provide a parallel series connection of resistors 33 of a same resistance and to connect its center points to the center point 31 to keep the series connection of the otherwise equal buffer capacitors 21 symmetric with regard to the voltages dropping over the individual capacitors 21. It is within the scope of one embodiment of the present invention that the voltage divider 32 provides the essential part of the input capacitance of the inverter 2. In this case, the center point 31 corresponds to the potential center point of the photovoltaic generator 3. Similarly, it is within the scope of one embodiment of the present invention that the voltage divider 32 provides the essential part of the intermediate voltage link 20 of the inverter 2 and that the center point 31 thus corresponds to the potential center point of the intermediate voltage link 20 of the inverter 2.

For essentially matching the potential center points of the AC output 8 of the inverter 2 and of the internal AC power grid prior to closing the relay 12 for connecting the inverter 2 to the internal AC power grid with the phases L1, L2 and L3, the offset voltage $U_{offset}$ may be reduced to a value below the order of half of the intermediate link voltage $U_{DCL}$ of the intermediate voltage link 20 of the inverter 2 prior to closing the relay 12. Alternatively, the offset voltage $U_{offset}$ may only be raised after closing the relay 12 up to a value in the order of half of the intermediate link voltage $U_{DCL}$ of the intermediate voltage link 20 of the inverter 2.

Although FIG. 2 only shows one inverter 2, a parallel connection of several inverters 2 in the solar power plant 1 is possible. For shifting the potential center points of the photovoltaic generators 3 of all inverters 2 connected in parallel, however, just a single DC voltage source 22 is sufficient which—as depicted—is connected between the center point 31 of a single inverter 2 and earth potential. The shift of the potential center point of the DC input 15 of the single inverter 2 results in a shift in the same direction of the potential center point of its AC output 8.

In one embodiment, the several inverters 2 are connected in parallel directly at the AC output 8 of the inverter 2, i.e. between the AC output 8 and the relay 12. In this case, the potential shift at the AC output 8 of the single inverter 2 has an effect on all inverters 2 and the associated photovoltaic generators 3. In this case, it is also possible to use a central relay 12 for simultaneously connecting all inverters 2 connected in parallel to the internal AC power grid with the phases L1, L2 and L3. This central relay 12 does not necessarily have to be accommodated in the inverter housing but may be provided as a separate component in a separate housing.

Even in the embodiment of the solar power plant 1 according to FIG. 1, the offset voltage $U_{offset}$ of the DC voltage source 22 may be reduced prior to closing the relay 12 to (further) reduce the voltage dropping over the switching contacts when closing the relay 12.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A method of connecting an AC output of a transformerless inverter of a solar power plant to an internal AC power grid at an input side of a transformer, an external AC power grid being connected to an output side of the transformer, the method comprising:
    synchronizing the AC output with the internal AC power grid;
    applying an offset voltage to a center point of the input side of the transformer;
    matching a center DC component of the AC output to the center point's voltage by selectively coupling one of the current-carrying lines of an inverter input to earth potential; and
    subsequently connecting the synchronized and matched AC output to the internal AC power grid.

2. The method of claim 1, further comprising disconnecting the current-carrying line of the inverter input from earth potential directly prior to connecting the synchronized and matched AC output to the internal AC power grid.

3. The method of claim 1, wherein the offset voltage is selected to provide a positive potential at all current-carrying lines of the inverter input after connecting a synchronized and balanced AC output to the internal AC power grid.

4. The method of claim 1, further comprising connecting a solar module to the inverter input.

5. The method of claim 1, wherein matching the center DC component of the AC output to the center point's voltage is performed as part of an isolation monitoring procedure of the inverter input.

6. The method of claim 1, wherein, in coupling the current-carrying line of the inverter input to earth potential, a controllable switch connected in series with a resistor in an earth connection line connected to the current-carrying line of the inverter input is closed.

7. An inverter system, comprising:
    a transformerless inverter configured to receive an intermediate DC voltage across current-carrying input lines at an input thereof, and generate an AC voltage at an AC output of the transformerless inverter, which AC output comprises an output line and a center point line;
    a transformer, wherein the center point line of the transformerless inverter is configured to couple to a center point of a primary winding of the transformer and to an offset voltage potential;
    a relay configured to selectively couple the output line of the transformerless inverter to a phase input of the primary winding of the transformer;
    an offset connection circuit configured to selectively connect one of the current-carrying input lines to near an earth ground potential; and
    a control circuit configured to activate the offset connection circuit to connect one of the current-carrying input lines to near the earth ground potential prior to activating the relay to couple the transformerless inverter to the transformer.

8. The inverter system of claim 7, wherein the control circuit is configured to deactivate the offset connection circuit to disconnect the one of the current-carrying input lines from the near the earth ground potential after activating the offset connection circuit and prior to activating the relay to couple the output line of the transformerless inverter to the phase input of the primary winding of the transformer.

9. An inverter system, comprising:
    a transformerless inverter configured to receive an intermediate DC voltage across current-carrying input lines at an input thereof, and generate an AC voltage at an AC output, which AC output comprises an output line and a center point line;
    a transformer;
    a relay configured to selectively couple the output line of the transformerless inverter to a phase input of a primary winding of the transformer;
    an intermediate voltage circuit coupled between the current-carrying input lines of the transformerless inverter, wherein the intermediate voltage circuit comprises first and second series impedances coupled together at a midpoint node;

an offset connection circuit configured to selectively connect the midpoint node of the intermediate voltage circuit to an offset voltage potential; and a control circuit configured to activate the offset connection circuit to connect the midpoint node to the offset voltage potential prior to activating the relay to couple the output line of the transformerless inverter to the phase input of the primary winding of the transformer.

10. The inverter system of claim 9, wherein the offset voltage potential is reduced to a value less than half of the intermediate DC voltage of the intermediate voltage circuit prior to activating the relay.

11. The inverter system of claim 9, wherein the offset voltage potential may only be raised up to a value of half of the intermediate DC voltage after activating the relay.

12. The inverter system of claim 9, wherein the first and second impedances of the intermediate voltage circuit comprises:

a pair of series-connected capacitances coupled between the current-carrying input lines of the transformerless inverter, wherein the pair of series-connected capacitances are connected together at the midpoint node.

13. The inverter system of claim 12, wherein the first and second impedances of the intermediate voltage circuit comprises:

a pair of series-connected resistances coupled between the current-carrying input lines of the transformerless inverter such that the pair of series-connected resistances is in parallel with the pair of series-connected capacitances, wherein the pair of series-connected resistances are connected together at the midpoint node.

* * * * *